No. 872,871. PATENTED DEC. 3, 1907.
C. A. WAYLAND.
MULTIPLYING ATTACHMENT.
APPLICATION FILED JUNE 14, 1906.

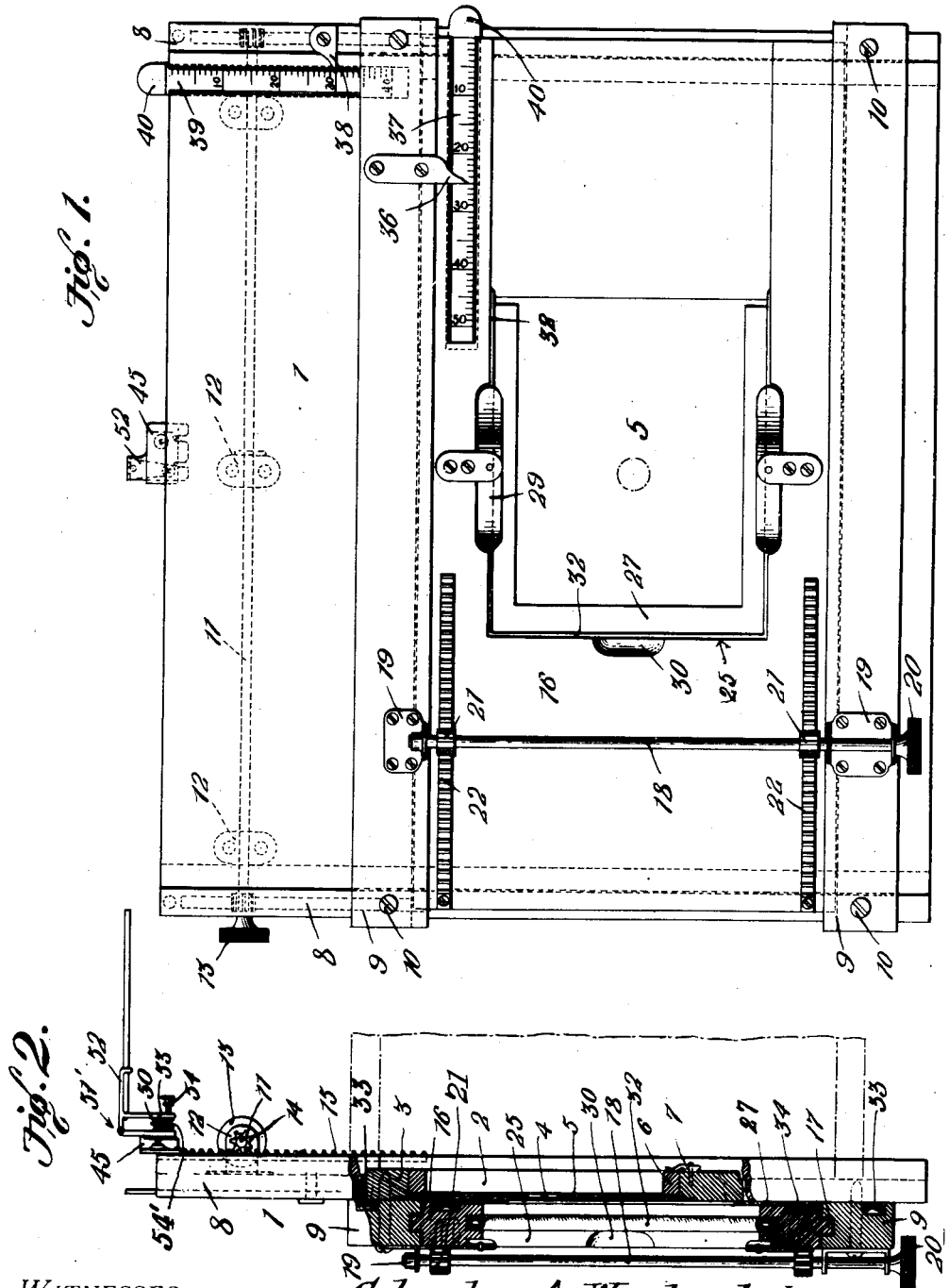

2 SHEETS—SHEET 2.

WITNESSES:

INVENTOR
Columbus A. Wayland,
By
ATTORNEYS

UNITED STATES PATENT OFFICE.

COLUMBUS A. WAYLAND, OF SOUTH KNOXVILLE, TENNESSEE.

MULTIPLYING ATTACHMENT.

No. 872,871.	Specification of Letters Patent.	Patented Dec. 3, 1907.

Application filed June 14, 1906. Serial No. 321,739.

*To all whom it may concern:*

Be it known that I, COLUMBUS A. WAYLAND, a citizen of the United States, residing at South Knoxville, in the county of Knox and State of Tennessee, have invented a new and useful Multiplying Attachment, of which the following is a specification.

This invention relates to a multiplying attachment for cameras by means of which a sensitive element can be exposed a plurality of times.

The object of the invention is to provide a simple, durable and inexpensive device of this character which is thoroughly efficient in operation and is adapted to be readily adjusted from one position to another so as to expose the different parts of the sensitive element or plate with great facility and accuracy.

A further object of the invention is to provide improved means for sighting the camera so as to avoid the difficulty which is frequently experienced in using a multiplying attachment.

With the foregoing and other objects in view, which will appear as the description proceeds, the invention resides in the combination and arrangement of parts and in the details of construction hereinafter described and claimed, it being understood that changes in the precise embodiment of invention herein disclosed may be made within the scope of the claims without departing from the spirit of the invention or sacrificing any of its advantages.

Figure 3:
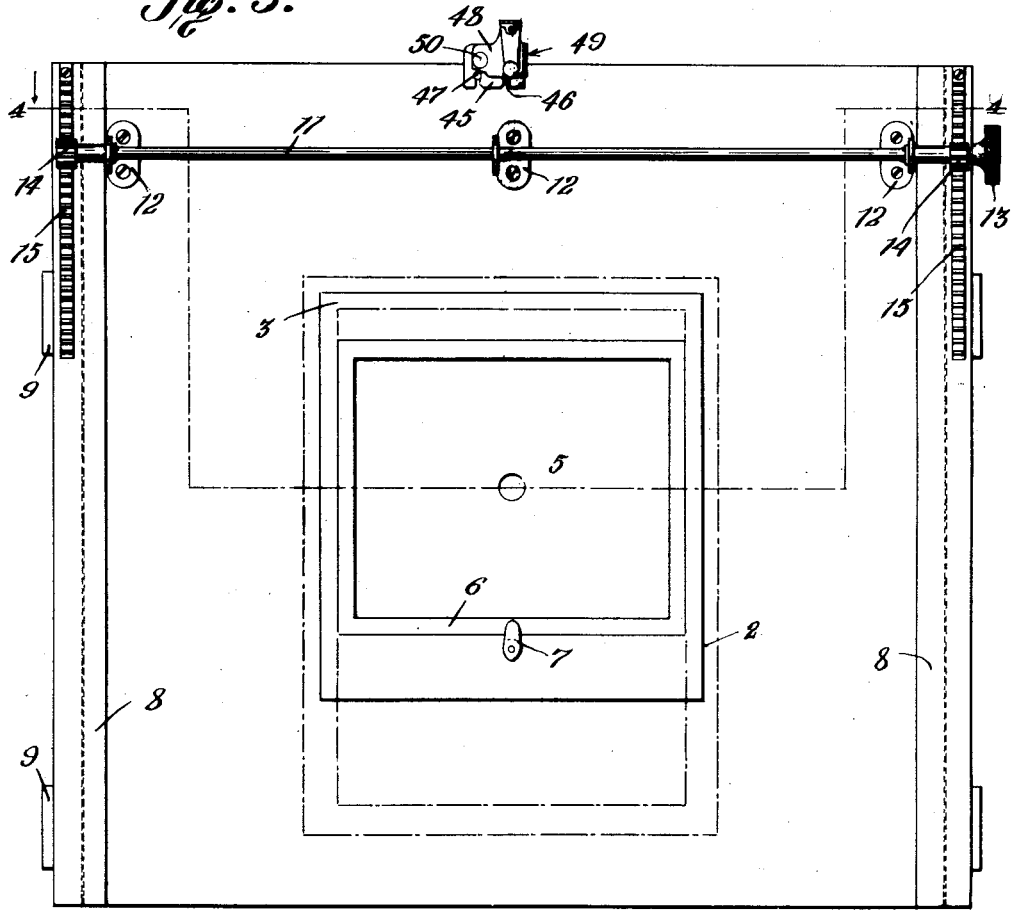
Figure 4:
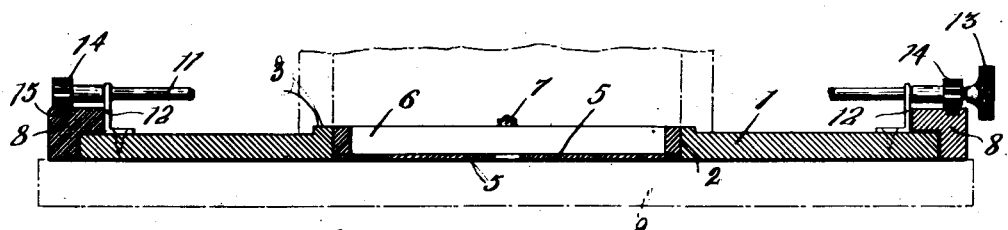

In the accompanying drawing forming a part of this specification: Figure 1 is a rear elevation of a multiplying attachment constructed in accordance with the invention. Fig. 2 is a vertical section through the center of the device, partly in elevation. Fig. 3 is a front elevation. Fig. 4 is a section on the line 4—4 of Fig. 3.

Like reference numerals indicate corresponding parts in the different figures of the drawings.

The improved attachment of this invention is constructed with an enlarged camera back 1 which is adapted to be secured to the rear end of a camera in any suitable manner after the ordinary camera back has been removed. The means for securing the multiplier attachment to the back of the camera, form no part of the present invention, and need not therefore be specifically described.

The camera back 1 is formed near its center with an opening 2 which is surrounded by a forwardly projecting flange 3 adapted to fit into the rear end of the camera as indicated by the dotted lines, so as to hold the camera back in proper position. The rear end of the opening 2 preferably is rabbeted or provided with a ledge 4 which preferably consists of a rectangular metallic frame secured to the camera back in any suitable manner. A diaphragm 5 which is formed with a central aperture of any suitable shape, which determines the shape of the picture, is removably fitted against the ledge 4 and is held therein by a rectangular frame 6 fitted into the opening 2 and removably secured in position in any suitable manner such as by means of the latch 7. Whenever it is desired to change the diaphragm 5 so as to substitute another diaphragm having a different opening, the latch 7 is operated and the frame 6 is removed, after which one diaphragm is taken out and another inserted.

In addition to the camera back 1, the present invention contemplates the use of a main frame which is to slide vertically on the camera back, and a plate holder frame which is to slide horizontally on the main frame, whereby the plate holder may be readily shifted into any desired position with respect to the opening in the diaphragm 5 so as to permit different parts of the plate or sensitive element to be exposed. The main frame which I prefer to use, consists of a pair of vertical bars 8 which are L-shaped in cross section, so as to fit against the sides and partially overlap the front edges of the camera back 1. In addition to the vertical bars 8, the main frame also includes a pair of horizontal bars 9, which are parallel with each other and extend across the rear face of the camera back 1, said horizontal bars 9 being secured to the vertical bars 8 in any suitable manner such as by means of screws 10. It will be apparent that the main frame consisting of the bars 8—8 and 9—9 is firmly secured to the camera back 1 and can slide readily in a vertical direction thereon.

The preferred mechanism for moving the main frame vertically upon the camera back 1, comprises a shaft 11 which extends horizontally across the front face of the camera back 1 and is journaled in angle brackets 12 which preferably rest against the inner edges of the L-shaped vertical bars 8 so as to limit their inward movement. On its outer end, the shaft 11 is provided with a milled wheel 13, by means of which it can be readily rotated. Adjacent to its opposite ends the shaft 11 is provided with a pair of pinions 14 which are constantly in mesh with a pair of vertically extending racks 15 which are set into suitable grooves formed in the front faces of the bars 8. It will be obvious that when the wheel 13 is rotated the main frame consisting of the bars 8 and 9 will be raised or lowered upon the camera back 1.

The plate holder frame, which as before mentioned is adapted to slide horizontally upon the main frame, is indicated by the numeral 16, and consists preferably of the rectangular piece of material adapted to fit between the horizontal bars 9—9 of the main frame, which bars act as guides for the plate holder frame. The plate holder frame 16 preferably is secured in the bars or guides 9—9 by means of a tongue and groove connection 17 which permits the plate holder frame to slide horizontally between the bars or guides 9—9.

The preferred mechanism by which the plate holder frame 16 is moved horizontally with respect to the main frame, comprises a shaft 18 which is journaled in suitable brackets 19 connected with the bars or guides 9. The shaft 18 is provided on one end with a milled operating wheel 20, and intermediate its ends said shaft is provided with a pair of pinions 21 which are constantly in mesh with a parallel pair of horizontal racks 22 suitably secured to the plate holder frame 16.

The plate holder frame 16 preferably is formed with a plate holder slot 25 which extends through one end thereof and terminates adjacent to the central portion thereof. Extending along three sides of the plate holder slot 25 is a suitable ledge 27 formed by a U-shaped member secured to the plate holder frame 16 and against which the plate holder is yieldingly held by means of the curved springs 29 which may be of any suitable form and construction. Adjacent to the plate holder, the plate holder frame 16 is formed with a cut-away portion 30 which is adapted to receive the finger when it is desired to remove the plate holder. It will be understood that the plate holder, in the act of inserting the same, is moved along until it passes under the springs 29 and is thereby pushed forward against the ledge 27, so as to prevent the plate holder from accidentally slipping out of place. The plate holder slot 25 preferably is provided with a packing strip 32 formed of felt or other suitable material adapted to press against the edge of the plate holder and prevent the entrance of light. The main frame is provided with a pair of packing strips 33 which press against the camera back and prevent the entrance of light. Furthermore, the plate holder frame 16 is provided along its sides with packing strips 34 which press against the camera back to prevent the entrance of light from the side.

In order to indicate at all times the position of the sensitive plate in the plate holder with respect to the opening in the diaphragm 5, I provide simple and improved indicating means which consists of a pointer 36 secured upon one of the bars 9 of the main frame, and a longitudinally extending scale 37 secured upon the plate holder frame 16. I also provide a pointer 38 upon one of the bars 8 of the main frame, and a scale 39 mounted upon the rear surface of the camera back 1. In view of the fact that it is frequently desirable to change the scales 37 and 39 when the diaphragm 5 is changed, so as to have scales which will correspond with the number of exposures which it is desired to make upon a single plate, I use scales which are readily removable. To this end each of the scales 37 and 39 preferably is formed with beveled edges and is slipped longitudinally into a suitable undercut slot which holds it securely in place, each of the scales 37 and 39 being provided at its end with a finger portion 40 by means of which it can be readily withdrawn from its slot when it is desired to use another scale or when packing the parts of the attachment together when not in use.

In the employment of multiplying attachments for cameras, great difficulty is frequently experienced in properly focusing the camera, or directing it accurately toward the object to be photographed, especially if the camera or the object is moved after one or two exposures. This is usually due to the fact that after the camera has been directed by means of the usual ground glass, the sensitive plate is introduced for a number of exposures. After the first exposure if the camera or the object should be moved out of focus, it would be extremely difficult to remove the sensitive plate so as to focus or direct the camera again by means of the ground glass. My present invention provides improved means for directing the camera when the multiplying attachment is used, so as to overcome the difficulties above set forth. The means which I prefer to use for accomplishing this result consists of a sighting device which is mounted preferably upon the upper end of the camera back 1 so that it can be adjusted to any desired position. The preferred form of sighting device comprises a base plate 45 formed in its lower end with slots 46 adapted to engage screws or other projections 47 secured in the front face of the camera back, by which means the base plate 45 can be readily attached to and detached from the camera back. Mounted upon the base plate 45 is a swinging member 48 which is pivotally connected to the base plate as indicated at 49 so that it can swing in a horizontal direction. The swinging movements of the member 48 preferably are secured by means of an adjusting screw 50 and a coil spring 54', the spring being opposed to the movement of the swinging member 48 toward the base plate 45, and the adjusting screw 50 being adapted to move the swinging member toward said plate. Pivoted upon the swinging member 48 as indicated at 51' is a sighting member 52 which is formed with notches similar to the sights of a rifle. The rear end of the sighting member 52 is bent down as indicated at 53 and is provided with an adjusting screw 54 on which is the coil spring 54'. By means of the swinging member 48, it will be apparent that the sighting member 52 can be swung in a horizontal plane, and by means of the adjusting screw 54 said sighting member 52 can be raised or lowered in a vertical plane, so that it will be possible to adjust the same until it is in accurate alinement with the object to be photographed.

The method of using the improved sight is as follows: When the proper diaphragm 5 has been secured in position in the camera back 1, an ordinary ground glass plate is inserted in the well-known manner into the plate holder slot 25, and the front end of the camera is opened in the usual manner so that the photographer looking through the ground glass can accurately point the camera. After the camera has been properly pointed the sighting member 52 is adjusted so that it points directly toward the object upon which the camera has been focused. The ground glass plate can now be removed and the holder containing the sensitive plate inserted. The main frame consisting of the bars 8 and 9 will then be adjusted to the proper vertical position and the plate holder frame 16 to the proper horizontal position. If now the camera or the object upon which it has been directed should have been moved, it is only necessary to sight along the member 52 in order to direct the camera properly toward the object. The sighting device 52 is maintained in its adjusted position until the diaphragm 5 is removed and replaced by a different diaphragm, after which it is necessary to readjust the sighting device. It will be obvious that the sighting device described constitutes a valuable improvement in this art, as it enables the camera to be readily directed toward any small object which it is desired to photograph.

By placing the operating mechanism consisting of the shaft 11 and pinions 14, upon the front face of the camera back, I am enabled to operate the main frame in a simple and improved manner as well as to dispose the operating mechanism out of the way and thus make the attachment simple and compact in construction.

What is claimed is:—

1. A multiplying attachment for cameras embodying a camera back a pair of longitudinally movable members adapted to engage the opposite edges of the camera back and having portions coöperating with the forward surface thereof, a pair of cross members secured to the members first mentioned and coöperating with the rear surface of the camera back to retain the longitudinally movable members in coöperative relation therewith, and a plate holder frame guided to operate between the said cross members.

2. A multiplying attachment for cameras embodying a camera back a frame comprising suitably spaced bars L-shaped in cross section and coöperating with two opposite edges and the forward surface of the camera back, and cross members arranged angularly to the said bars and coöperating with the rear surface of the camera back to retain the L-shaped bars in coöperative relation therewith, said cross members being provided with guides at their proximate sides, and a plate holder frame operating longitudinally between the said cross members.

3. A multiplying attachment for cameras embodying a camera back a vertically movable frame composed of a pair of suitably spaced bars engaging the vertical edges of the camera back, racks secured to the forward surfaces of said bars, a pinion shaft journaled on the forward surface of the camera back and having pinions on its ends coöperating with the racks on the said bars for adjusting the latter relatively to the camera back, cross members rigidly connecting the said bars and coöperating with the rear surface of the camera back to retain the said bars in coöperative relation therewith, and a plate holder frame carried by the cross members.

4. A multiplying attachment for cameras embodying a camera back a frame composed of a pair of spaced bars having portions coöperating with two opposite edges and the forward surface of the camera back, and a pair of suitably spaced cross members rigidly connecting the said bars and coöperating with the rear surface of the camera back to retain the said bars in coöperative relation therewith, a pinion shaft having its ends journaled on the cross members and provided with pinions toward its ends, a plate holder frame slidable longitudinally between the cross members, and a pair of racks carried by the plate holder frame and coöperating with the pinions on said shaft.

5. A multiplying attachment for cameras embodying a camera back a frame composed of vertical and horizontal bars rigidly connected, a pair of racks secured to the vertically extending bars, a pinion shaft journaled on the camera back and having pinions at its ends coöperating with the said racks to adjust the frame vertically relatively to the camera back, a plate holder frame adjustable longitudinally between the horizontal bars, a pair of racks arranged thereon toward its longitudinal edges, a pinion shaft journaled on the horizontal bars, and pinions on said latter shaft coöperating with the racks on the plate holder frame for adjusting the latter horizontally relative to the camera back.

6. A multiplying attachment for cameras embodying a camera back adapted to be attached to a camera, and a frame movable in a plane parallel to the camera back and adapted to carry a plate holder, one of the parts having an under-cut slot formed in its surface and extending in the direction of relative movement of the parts, a scale removably fitted into the under-cut slot and having suitable characters corresponding to the different positions of the camera back and frame, and a pointer adapted to coöperate with said scale for designating the different relative positions of the frame and the camera back.

7. A multiplying attachment for cameras embodying a camera back, and a frame adjustable relatively thereto and adapted to carry a plate holder frame, the camera back being provided with an under-cut slot extending inwardly from one of its edges and in the direction of relative movement of the camera back and frame, a scale having correspondingly beveled edges adapted to removably fit the said slot, and a pointer on the first-mentioned frame adapted to coöperate with the said scale.

8. A multiplying attachment for cameras embodying a camera back having an undercut slot extending inwardly from one of its edges, a frame adjustable relatively to the camera back in a direction parallel to the said slot, a plate holder frame adjustable transversely on the frame first mentioned and having an undercut slot extending inwardly from one of its edges, detachable scales removably fitted into the slots on the camera back and plate holder frame, and pointers on the frame first mentioned adapted to coöperate with the said scales.

9. A multiplying attachment comprising a camera back adapted to hold interchangeable diaphragms, a main frame movable thereon, a frame for receiving a plate holder movably mounted on the said main frame, and detachable indicating means on the said frames.

10. A multiplying attachment comprising a camera back, a main frame movable thereon, a frame for receiving a plate holder movably mounted on the main frame, and readily detachable scales on the frames having handle portions.

11. A multiplying attachment comprising a camera back having a rabbeted opening therein, a diaphragm in the opening, and a rectangular frame for securing said diaphragm in position.

12. A multiplying attachment comprising a camera back, a pair of L-shaped uprights engaging the front and ends of the camera back, a pair of spaced cross members disposed at the rear of the camera back and rigidly connected with the uprights for holding the latter on the back, racks on the front sides of the uprights, a horizontal shaft supported on the back at the front side thereof, pinions on the shaft meshing with the racks, a frame for receiving a plate holder movable between the cross members and movable vertically therewith, horizontal racks on the rear side of the said frame, a vertical shaft mounted on the cross members, and pinions thereon meshing with the horizontal racks.

In testimony that I claim the foregoing as my own, I have hereto affixed my signature in the presence of two witnesses.

COLUMBUS A. WAYLAND.

Witnesses:
JNO. E. HOOD,
F. W. SOBOLEIVSKI.